US011119849B2

(12) United States Patent
Li et al.

(10) Patent No.: US 11,119,849 B2
(45) Date of Patent: Sep. 14, 2021

(54) ERASURE CODE-BASED PARTIAL WRITE-IN

(71) Applicant: BEIJING SANKUAI ONLINE TECHNOLOGY CO., LTD, Beijing (CN)

(72) Inventors: Huiba Li, Beijing (CN); Zhiming Zhang, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 259 days.

(21) Appl. No.: 16/461,520

(22) PCT Filed: Nov. 2, 2017

(86) PCT No.: PCT/CN2017/109154
§ 371 (c)(1),
(2) Date: May 16, 2019

(87) PCT Pub. No.: WO2018/090837
PCT Pub. Date: May 24, 2018

(65) Prior Publication Data
US 2019/0347160 A1 Nov. 14, 2019

(30) Foreign Application Priority Data
Nov. 16, 2016 (CN) .......................... 201611022236.0

(51) Int. Cl.
*G06F 11/10* (2006.01)
*G06F 11/00* (2006.01)
*G11B 20/10* (2006.01)

(52) U.S. Cl.
CPC ...... *G06F 11/1056* (2013.01); *G06F 11/1004* (2013.01); *G06F 11/1044* (2013.01); *G06F 11/1076* (2013.01); *G11B 20/10268* (2013.01)

(58) Field of Classification Search
CPC ............. G06F 11/1056; G06F 11/1004; G06F 11/1044; G06F 11/1076; G11B 20/10268
See application file for complete search history.

(56) References Cited

U.S. PATENT DOCUMENTS 9,063,658 B2* 6/2015 Resch .................... H04N 21/20
10,133,633 B2* 11/2018 Wang .................... G06F 3/0617
(Continued)

FOREIGN PATENT DOCUMENTS

CN 102681793 A 9/2012
CN 102696017 A 9/2012
(Continued)

OTHER PUBLICATIONS

State Intellectual Property Office of the People's Republic of China, Office Action and Search Report Issued in Application No. 2016110222360, dated Aug. 16, 2019, 26 pages (Submitted with Machine Translation).
(Continued)

*Primary Examiner* — Justin R Knapp
(74) *Attorney, Agent, or Firm* — Greenblum & Bernstein, P.L.C.

(57) ABSTRACT

An erasure code-based partial write-in method and apparatus are provided. According to the method, a data node receives a first updating request carrying updating data and first version information from a client, wherein the first version information is information stored by the client and indicating a version of a target data block to be updated with the updating data, a data amount of the updating data is less than a data amount of one erasure code group which comprises m data blocks and k check data blocks, both m and k being natural numbers; the data node acquires second version information in response to the first updating request, wherein the second version information is information stored in the node and indicating the version of the target
(Continued)

data block; the data node processes the updating data according to a matching result of the first version information and second version information.

20 Claims, 5 Drawing Sheets

(56) References Cited

U.S. PATENT DOCUMENTS

| | | | | |
|---|---|---|---|---|
| 10,585,762 | B2* | 3/2020 | Sankar | G06F 16/116 |
| 10,831,726 | B2* | 11/2020 | Soza | G06F 16/25 |
| 2006/0075004 | A1* | 4/2006 | Stakutis | G06F 16/10 |
| 2011/0208996 | A1 | 8/2011 | Hafner et al. | |
| 2013/0198585 | A1 | 8/2013 | Braam et al. | |
| 2016/0182088 | A1 | 6/2016 | Sipos et al. | |
| 2016/0246516 | A1 | 8/2016 | Zhang | |

FOREIGN PATENT DOCUMENTS

| | | |
|---|---|---|
| CN | 103558998 A | 2/2014 |
| CN | 103561057 A | 2/2014 |
| CN | 104158897 A | 11/2014 |
| CN | 104407808 A | 3/2015 |
| CN | 105242879 A | 1/2016 |
| CN | 106708651 A | 5/2017 |

OTHER PUBLICATIONS

State Intellectual Property Office of the People's Republic of China, Notice of Rejection of decision Issued in Application No. 2016110222360, dated Jan. 10, 2020, 24 pages. (Submitted with Partial Translation).

State Intellectual Property Office of the People's Republic of China, Office Action and Search Report Issued in Application No. 201611022236.0, dated Mar. 4, 2019, 24 pages,(Submitted with Machine Translation).

ISA State Intellectual Property Office of the People's Republic of China, International Search Report issued in Application No. PCT/CN2017/109154, dated Feb. 1, 2018, WIPO, 4 pages.

ISA State Intellectual Property Office of the People's Republic of China, Written Opinion of the International Searching Authority Issued in Application No. PCT/CN2017/109154, dated Feb. 1, 2018, WIPO, 5 pages.

* cited by examiner

ERASURE CODE-BASED PARTIAL WRITE-IN

CROSS REFERENCE TO RELATED APPLICATION

This application claims priority to Chinese Patent Application No. 201611022236.0 entitled "ERASURE CODE-BASED PARTIAL WRITE-IN METHOD AND APPARATUS, STORAGE MEDIUM AND DEVICE" filed on Nov. 16, 2016, the entire content of which is incorporated herein by reference.

TECHNICAL FIELD

The present disclosure relates to storage technology, and in particular to an erasure code-based partial write-in method and apparatus.

BACKGROUND

An Erasure Code (EC) originates from the communications field, presently, has become to be applied in a large-scale storage system, especially a distributed storage system to realize data redundancy protection. The erasure code redundancy protection solves a problem that a traditional redundancy protection technology is not applicable to a distributed production storage system. Erasure coding is an encoding technology for data recovery. Raw data is usually divided into "n" raw data blocks with each block being L bytes, where L is a fixed value; further, "k" check data blocks with each block being L bytes may be obtained by performing encoding and computation with every m raw data blocks (that is, "k" check data blocks are obtained by performing redundancy computation based on "m" raw data blocks, and the check data is also referred to as redundant data), and "m" raw data blocks ("m" data blocks) and "k" check data blocks ("k" check blocks) are stored together, where "m" raw data blocks and "k" check data blocks are referred to as one EC group; if there are at most "k" data blocks in "m+k" data blocks which have an error and are damaged or lost, the distributed storage system may recover all raw data ("m" raw data blocks) by performing decoding and computation, where m is less than or equal to n.

A write-in operation or updating operation is a common operation of a storage system. An encoding and computation process of the write-in operation may usually be completed at a client, and may also be completed at a node (a data node). The write-in operation includes complete write-in and partial write-in, where the partial write-in refers to that: if a write-in length of one write operation is not an integer multiple of L*m, the write operation is referred to as partial write-in. It is assumed that L=4 KB (kilobyte) and m=8. If the length of one write operation is not an integer multiple of 32 KB, the write operation is partial write-in since the write operation needs to partially update a particular target EC group, that is, the written-in new data is insufficient to fill the particular EC group. It is to be noted that the write-in operation actually is an updating operation.

During an existing partial write-in, when a write-in process is terminated due to an error, the storage system cannot identify a fault, nor correctly retry the write-in operation, nor correctly perform a data recovery operation. For example, if raw data blocks are successfully updated by a particular updating operation and all check data blocks cannot be updated due to a fault, the storage system will not be able to identify which of the raw data blocks and the check data blocks are new in a subsequent recovery process, resulting in inability to perform the data recovery operation. Thus, it can be seen that a fault-tolerance problem is completely neglected in the write-in process in the prior art.

SUMMARY

In view of this, an example of the present disclosure provides an erasure code-based partial write-in method and apparatus to solve at least one problem existing in the prior art. In this case, when a write-in process is terminated due to an error, a fault can be identified to correctly, retry a write-in operation and correctly perform a data recovery operation.

Technical solutions of examples of the present disclosure are achieved below.

According to a first aspect, an example of the present disclosure provides an erasure code-based partial write-in method, including:

receiving, by a data node, a first updating request carried with updating data and first version information from a client, where the first version information is information that is stored by the client and used for indicating a version of a target data block to be updated with the updating data, a data amount of the updating data is less than a data amount of one erasure code group, the erasure code group includes m data blocks and k check data blocks, and both m and k are natural numbers;

acquiring, by the data node, second version information in response to the first updating request, where the second version information is information that is stored in the data node and used for indicating the version of the target data block; and processing, by the data node, the updating data according to a matching result of the first version information and the second version information.

According to a second aspect, an example of the present disclosure provides an erasure code-based partial write-in method, including:

determining, by a client, updating data and identification information of a target data block to be updated with the updating data, a data amount of the updating data being less than a data volume of one erasure code group, where the erasure code group includes one or more data blocks and check data blocks for recovering the data blocks;

determining, by the client, identification information of a corresponding data node according to the identification information of the target data block;

determining, by the client, first version information indicating a current version of the target data block according to the identification information of the target data block;

carrying, by the client, the updating data and the first version information in a first updating request;

sending, by the client, the first updating request to the data node according to the identification information of the data node;

receiving, by the client, a first updating response from the data node, where the first updating response is carried with an update result; and updating, by the client, the first version information when the update result indicates a successful update.

According to a third aspect, an example of the present disclosure provides an erasure code-based partial write-in method, including that:

receiving, by a check node, a second updating request from a data node, where the second updating request is carried with a check increment;

updating, by the check node, a check data block stored in the check node according to the check increment in response to the second updating request to acquire an updated check data block;

updating, by the check node, a version vector stored in the check node in response to the second updating request, where the version vector includes version information of m data blocks in an erasure code group corresponding to a target data block to be updated, the erasure code group also includes k check data blocks for recovering the m data blocks, and both m and k are natural numbers; and sending, by the check node, a second updating response to the data node, where the second updating response is carried with a result indicating whether the check data block is successfully updated with the check increment.

According to a fourth aspect, an example of the present disclosure provides an erasure code-based partial write-in apparatus, including a first determining unit, a first acquiring unit and a processing unit, where, the first determining unit is configured to receive a first updating request carried with updating data and first version information from a client, where the first version information is information that is stored by the client and used for indicating a version of a target data block to be updated with the updating data, a data volume of the updating data is less than a data volume of one erasure code group, the erasure code group includes m data blocks and k check data blocks, and both m and k are natural numbers;

the first acquiring unit is configured to acquire second version information in response to the first updating request, where the second version information is information that is stored in the data node and used for indicating the version of the target data block; and the processing unit is configured to process the updating data according to a matching result of the first version information and the second version information.

According to a fifth aspect, an example of the present disclosure provides an erasure code-based partial write-in apparatus, including a second determining unit, a third determining unit, a fourth determining unit, a carrying unit, a second receiving unit and a first updating unit, where, the second determining unit is configured to determine updating data and identification information of a target data block to be updated with the updating data, where a data volume of the updating data is less than a data volume of one erasure code group, and the erasure code group includes one or more data blocks and check data blocks for recovering the data blocks;

the third determining unit is configured to determine identification information of a corresponding data node according to the identification information of the target data block;

the fourth determining unit is configured to determine first version information indicating a current version of the target data block according to the identification information of the target data block;

the carrying unit is configured to carry the updating data and the first version information in a first updating request and send the first updating request to the data node according to the identification information of the data node;

the second receiving unit is configured to receive a first updating response from the data node, where the first updating response is carried with an update result; and the first updating unit is configured to update the first version information when the update result indicates a successful update.

According to a sixth aspect, an example of the present disclosure provides an erasure code-based partial write-in apparatus, including a third receiving unit, a fifth determining unit, a second updating unit and a third sending unit, where, the third receiving unit is configured to receive a second updating request from a data node, where the second updating request is carried with a check increment;

the fifth determining unit is configured to update a check data block stored in the apparatus according to the check increment in response to the second updating request to acquire an updated check data block;

the second updating unit is configured to update a version vector stored in the apparatus in response to the second updating request, where the version vector includes version information of m data blocks in an erasure code group corresponding to a target data block to be updated, the erasure code group also includes k check data blocks for recovering the m data blocks, and both m and k are natural numbers; and the third sending unit is configured to send a second updating response to the data node, where the second updating response is carried with a result indicating whether the check data block is successfully updated with the check increment.

According to a seventh aspect, an example of the present disclosure provides a machine readable storage medium storing machine executable instructions, where the machine executable instructions are executed by a processor to perform the above erasure code-based partial write-in method.

According to an eighth aspect, an example of the present disclosure provides a data updating device, including a storage medium, a processor and machine executable instructions that are stored on the storage medium and executable by the processor, where the machine executable instructions are executed by the processor to implement the above erasure code-based partial write-in method.

According to the technical solutions of the examples of the present disclosure, a first updating request carried with updating data and first version information may be received from a client, where the first version information is information that is stored by the client and used for indicating a version of a target data block to be updated with the updating data, and a data amount of the updating data is less than a data amount of one erasure code group; second version information is acquired in response to the first updating request, where the second version information is information that is stored by a data node and used for indicating the version of the target data block; and the updating data is processed according to a matching result of the first version information and the second version information. In this case, when a write-in process is terminated due to an error, a fault can be identified to correctly retry a write-in operation and correctly perform a data recovery operation.

DETAILED DESCRIPTION OF THE EMBODIMENTS

The technical solutions of examples of the present disclosure will be described clearly and fully below in combination with drawings in the examples of the present disclosure. It is apparent that the described examples are merely part of examples of the present disclosure rather than all examples. Other examples achieved by those of ordinary skill in the art based on the examples in the present disclosure without paying creative work shall all fall into the scope of protection of the present disclosure.

To better understand different examples of the present disclosure, encoding and decoding algorithms of an erasure code in the related art will be firstly described, which includes the following blocks.

(1) an encoding coefficient matrix $A=[a_{ij}]_{k \times m}$ is generated according to m and k.

In an actual operation process, the encoding coefficient matrix $A=[a_{ij}]_{k \times m}$ may also be generated in consideration of other factors in addition to the numbers m and k, where a number of rows of the encoding coefficient matrix is k, and a number of columns of the encoding coefficient matrix is m; $a_{ij}$ refers to an element in the i-th row and the j-th column, i is an integer that is greater than or equal to 1 and less than or equal to k, and j is an integer that is greater than or equal to 1 and less than or equal to m.

(2) original "m" raw data blocks are set to $d_i$, where i=1 . . . m, and the j-th byte in the i-th raw data block is denoted as $d_{ij}$, where j=1 . . . L.

(3) original "k" check data blocks are set to $p_i$, where i=1 . . . k, and the j-th byte in the i-th check data block is denoted as $p_{ij}$, where j=1 . . . L.

(4) an encoding formula is referred to formula (1).

$$(p_{1j}p_{2j} \ldots p_{kj})^T <== A*(d_{1j}d_{2j} \ldots d_{mj})^T \quad (1)$$

In the formula (1), j=1 . . . L, where <== refers to an assignment.

(5) at the time of decoding, if the data is lost, a decoding matrix B is acquired by excluding the rows corresponding to the lost data blocks and the lost encoding blocks from the encoding matrix A. The known raw data and necessary check data are substituted into the formula (1), and then, unknown raw data is obtained based on an algorithm for solving linear equations. For example, the raw data may be obtained by replacing the matrix A with the matrix B and multiplying an inverse matrix B' of the matrix B with both sides of the formula (1). The encoding and decoding manners herein are an example given only for describing the encoding and decoding algorithms of the erasure code, and the encoding and decoding manners available to the technical solution of the present disclosure are not limited herein.

Operations such as addition, subtraction, multiplication and division involved in all of the above computing processes are all defined in the Galois Field (GF) ($2^8$) rather than in a real number field. It is to be noted that the above encoding and decoding algorithms of the erasure code may also be used in another form in an implementation process, and persons skilled in the art may certainly perform the implementation in another form, which is not limited herein.

In a distributed storage system, to improve data reliability, "m+k" data blocks in each EC group may be stored in "m+k" different servers, and each server is referred to as one node, where the servers for storing data blocks (e.g., raw data blocks) may be referred to as data nodes, and the servers for storing check data blocks may be referred to as check nodes.

A relationship of an updating operation and a difference between raw data and updating data will be described below, and by expanding the formula (1) for an encoding operation:

$$(p_{1j}p_{2j} \ldots p_{kj})^T <= A*(d_{1j}d_{2j} \ldots d_{mj})^T, (j = 1 \ldots L),$$

$$p_{1j} =$$

$$(a_{11}a_{12} \ldots a_{1m}) \cdot (d_{1j}d_{2j} \ldots d_{mj}) = \sum a_{1i} \cdot d_{ij} (i = 1 \ldots m)$$

$$p_{2j} = \sum a_{2i} \cdot d_{ij} (i = 1 \ldots m)$$

$$\ldots$$

$$p_{kj} = \sum a_{ki} \cdot d_{ij} (i = 1 \ldots m)$$

may be obtained.

If the i-th data in $(d_{1j}d_{2j} \ldots d_{mj})$ is updated to $d_{ij}'$ in the updating operation, $$p_{1j}' = (a_{11}a_{12} \ldots a_{bn}) \cdot (d_{1j}d_{2j} \ldots d_{ij}' \ldots d_{mj})$$

$$p_{1j}' = \sum a_{1i} \cdot d_{ij} - a_{1i} \cdot d_{ij} + a_{1i} \cdot d_{ij}'$$

$$p_{1j}' = p_{1j} - a_{1i} \cdot \Delta d_{ij}$$

$$p_{2j}' = p_{2j} - a_{2i} \cdot \Delta d_{ij}$$

$$\ldots$$

$$p_{kj}' = p_{kj} - a_{ki} \cdot \Delta d_{ij}$$

that is, $\Delta p_{xj} = a_{xi} \cdot \Delta d_{ij}, \ x = 1 \ldots k.$

In the above formula, $\Delta p_{xj}$ is a check increment indicating an updating amount of a check data block. Therefore, the update of the check block may only rely on a change amount $\Delta d_{ij}$ of the modified data. The above conclusion $\Delta p_{xj} = a_{xi} \cdot \Delta d_{ij}$ may be written as $\Delta p = a \cdot \Delta d$ for short, and recorded as formula (2).

According to the formula (2), the updating operation or the write-in operation in the related art generally includes the following blocks.

1) a data node to be updated receives an updating request of data $d_0$ in a data block from a client, and the updating request is used to update the data $d_0$ in the data block to $d_0'$, where the updating request carries the updating data $d_0'$.

2) the data node to be updated reads the data $d_0$ into an internal a local magnetic disk.

3) a check increment set $\{\Delta P_1, \Delta P_2, \ldots, \Delta P_k\}$ needed for all "k" check nodes is calculated in the internal memory of the data node to be updated based on the equation $\Delta p = a \cdot \Delta d$.

4) the data node to be updated writes the updating data $d_0'$ into the local magnetic disk.

5) the data node to be updated sends the "k" check increments to the "k" check nodes concurrently through a network respectively.

6) each check node reads raw check data p from the local magnetic disk and calculates a new check data block p' by using a received temporary data block, i.e., a check increment $\Delta p$ and an equation $p'=p+\Delta p$; the check node writes the updated check data block p' into the local magnetic disk and sends an signal indicating that the update is completed to the data node to be updated.

7) the data node to be updated finishes receiving the signals indicating that the update is completed from all redundant nodes (the check nodes), and then sends the signal indicating that the update is completed to an erasure code cluster storage system or client.

As can be seen from the above, when a write-in process is terminated due to an error, a system cannot identify a fault, nor correctly retry a write-in operation, and nor correctly perform a data recovery operation. For example, if raw data blocks are successfully updated in an updating operation and all check data blocks cannot be updated due to a fault, the system will not be able to identify which of the raw data blocks and the check data blocks are new in a subsequent recovery process, thereby resulting in inability to perform the data recovery operation.

The technical solutions of the present disclosure will be further described in detail below in conjunction with accompanying drawings and specific examples.

Figure 1A:
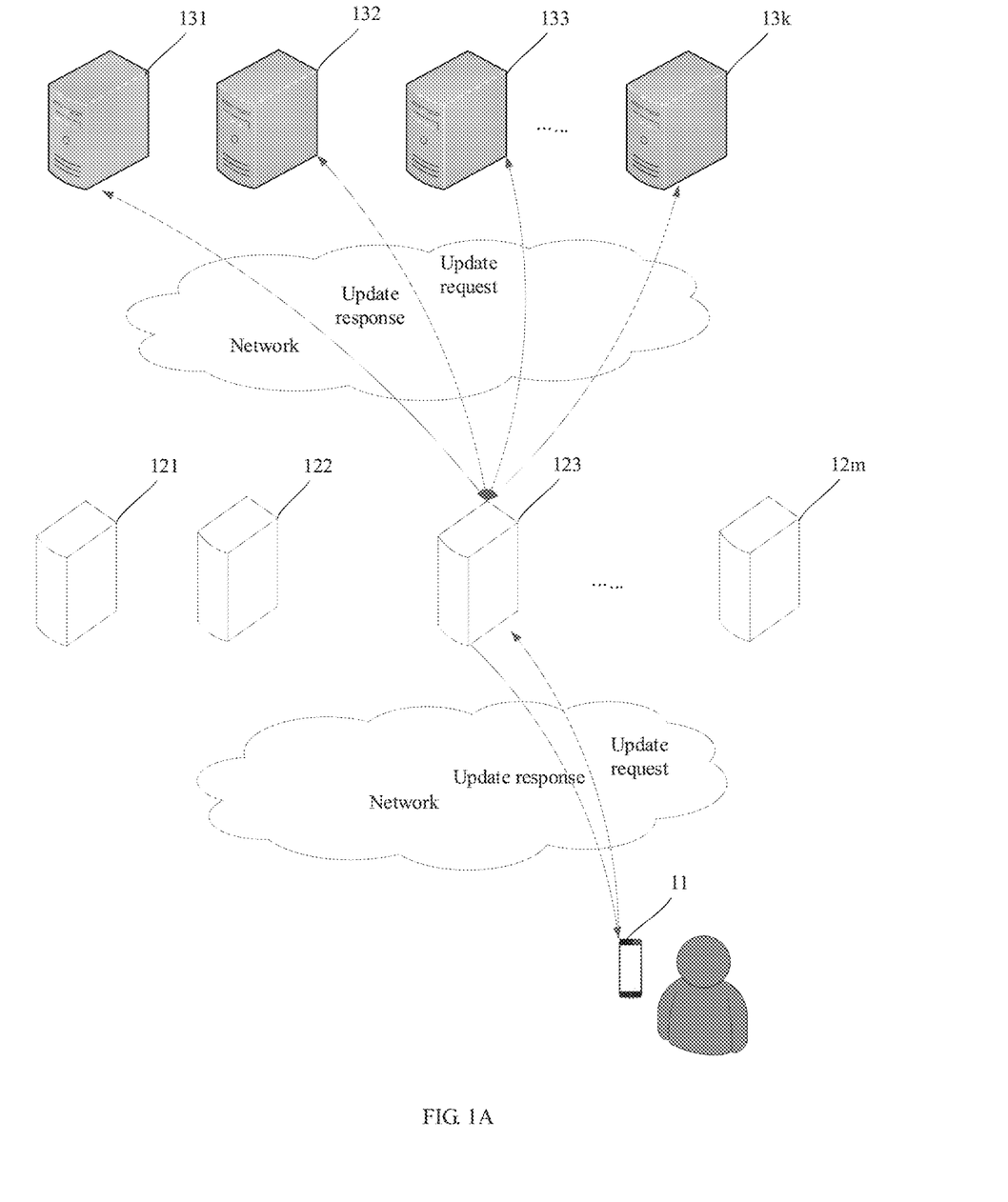
FIG. 1A is a schematic diagram illustrating a network architecture of an erasure code-based distributed storage system according to an example of the present disclosure.

To solve the technical problems described above, an example of the present disclosure provides an erasure code-based partial write-in method, which may be applied to an erasure code-based distributed storage system. As shown in FIG. 1A, for one EC group, the erasure code-based distributed storage system at least includes one client 11, "m" data nodes 121-12m and "k" check nodes 131-13k, where both "m" and "k" are natural numbers greater than 1. In implementation, the client may be installed on an electronic device, and both the data nodes and the check nodes may be implemented by a server. The server and the electronic device may be implemented by various computing devices having an information processing capability. For example, the electronic device may be a smart phone, a laptop computer, a desktop computer, a personal digital assistant, a smart television, and the like. In addition, the server may also be implemented by a server cluster.

Figure 1B:
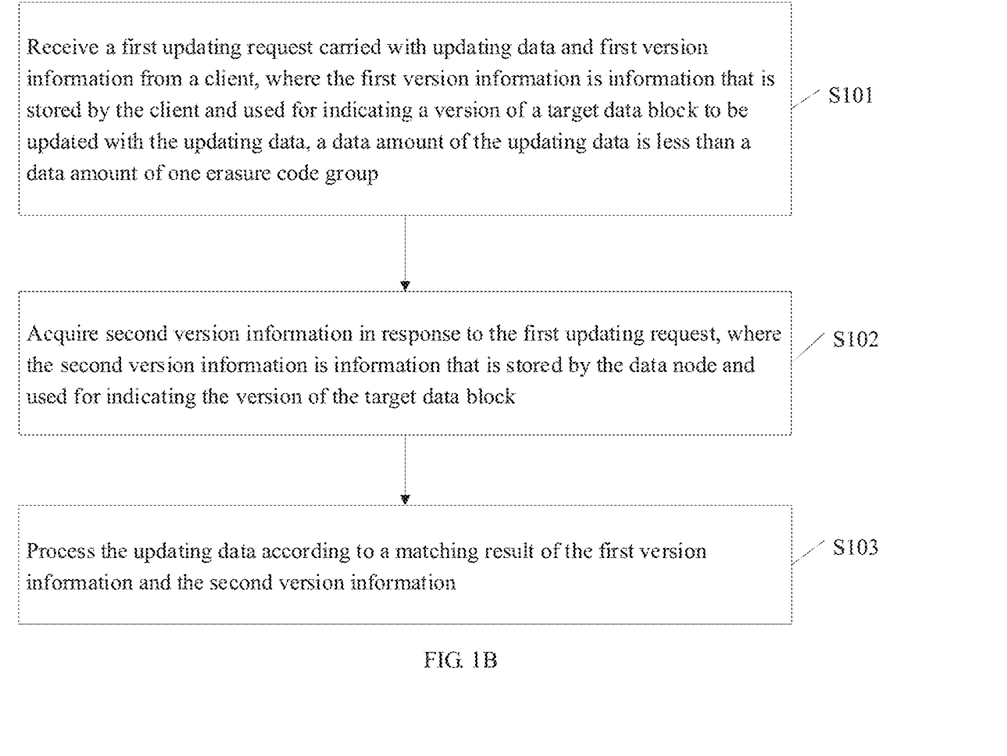
FIG. 1B is a schematic flowchart illustrating implementation of an erasure code-based partial write-in method according to a first example of the present disclosure.

FIG. 1B is a schematic flowchart illustrating an implementation of an erasure code-based partial write-in method according to a first example of the present disclosure. The method includes the following blocks.

At block S101, a data node receives a first updating request carrying updating data and first version information from a client, where the first version information is information that is stored by the client and used for indicating a version of a target data block to be updated with the updating data, a data amount of the updating data is less than a data amount of one erasure code group, the erasure code group includes "m" data blocks and "k" check data blocks, and both "m" and "k" are natural numbers.

At block S102, the data node acquires second version information in response to the first updating request, where the second version information is information that is stored by the data node and used for indicating the version of the target data block.

The data node itself may maintain the version information of the data block. Therefore, the data node may acquire the second version information from itself.

At block S103, the data node processes the updating data according to a matching result between the first version information and the second version information.

The block S103 may include the following processing.

Firstly, the data node may obtain a first determination result by determining whether the first version information is matched with the second version information.

Determining whether the first version information is matched with the second version information may include: determining whether the first version information is same as the second version information; if yes, the first version information is matched with the second version information; if no, the first version information is not matched with the second version information. Generally, the second version information is the latest version information. If the second version information is higher than the first version information, it indicates that the client forgets to update the version information at a time; if the second version information is lower than the first version information, it indicates that the data node does not complete the update at a time but the client considers that the update is already completed and thus updates its version information. No matter whether the second version information is higher or lower than the first version information, as long as the two pieces of version information are not matched, the data node will send error information (an unsuccessful update result) to the storage system or the client.

Next, the data node may process the updating data according to the first determination result.

In an example of the present disclosure, processing the updating data according to the first determination result may include: if the first determination result indicates that the first version information is not matched with the second version information, sending a first updating response, where the first updating response carries an unsuccessful update result and a cause value, and the cause value is used to indicate that the unsuccessful update result is caused by an error of the first version information.

The cause value may be a numerical value or a code which is only used for representing an unsuccessful update caused by the error of the first version information.

In this case, the data node may discard the updating data.

Processing the updating data according to the first determination result may also include: if the first determination result indicates that the first version information is matched with the second version information, determining a check increment set $\{\Delta P_1, \Delta P_2, \ldots, \Delta P_g, \ldots, \Delta P_k\}$ according to the updating data and the target data block, where the check increments refers to updating amounts of the check data blocks, $\Delta P_g$ refers to the check increment of the g-th check node, and g is greater than or equal to 1 and less than or equal to k.

In this case, the data node may carry the check increment $\Delta P_g$ of the g-th check node in a second updating request and sends the second updating request to the g-th check node, where the second updating request is used to trigger the g-th check node to update the check data block stored by itself according to the check increment $\Delta P_g$ and update a version vector stored by the g-th check node.

In another example of the present disclosure, processing the updating data according to the first determination result may include: if the first determination result indicates that the first version information is matched with the second version information, updating the target data block stored in the data node with the updating data; and updating the second version information after completing updating the target data block.

In another example of the present disclosure, the data node sends a first updating response to a client after completing updating the target data block, where the first updating response carries a successful update result, and the successful update result is used to trigger the client to update the first version information. In this example, since the client is the last one to update the version information of the data block, it indicates that the previous updating operation or write operation is not completely successful as long as the client fails to update the version information. Therefore, a timer may be set so that the client may re-initiate an updating request if the update is unsuccessful within a specified time.

In an example of the present disclosure, the data node may maintain one piece of version information (version number) incremented automatically, for each raw data block. When there is a write-in operation, the data node may firstly determine whether version information (first version information) of the received data is matched with version information (second version information) stored by itself. If matched, the data node may perform updating with data in the updating request; otherwise, the data node returns an unsuccessful update result to the client. Therefore, a problem that the system cannot identify a fault to correctly retry a write-in operation and correctly perform a data recovery operation when the write-in process is terminated due to an error can be avoided.

Figure 2:
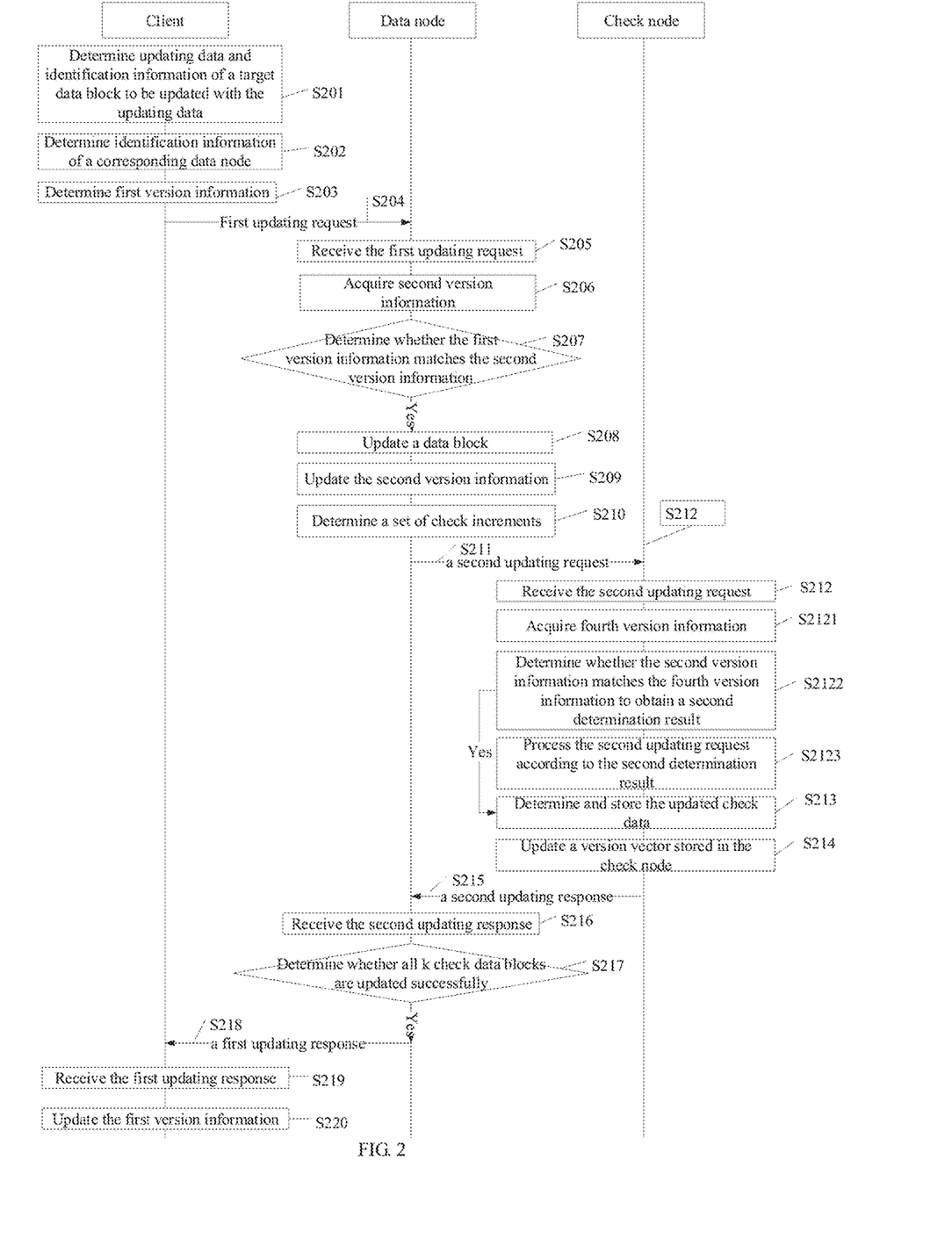
FIG. 2 is a schematic flowchart illustrating implementation of an erasure code-based partial write-in method according to a second example of the present disclosure.

Based on the above example, the present disclosure provides an erasure code-based partial write-in method in an example. FIG. 2 is a flowchart illustrating implementation of an erasure code-based partial write-in method according to a second example of the present disclosure. As shown in FIG. 2, the method includes the following blocks.

At block S201, a client determines updating data and identification information of a target data block to be updated with the updating data.

A data amount of the updating data is less than a data amount of one erasure code group.

At block S202, the client determines identification information of a corresponding data node according to the identification information of the target data block.

At block S203, the client determines current version information of the target data block according to the identification information of the target data block and takes the current version information of the target data block as first version information.

At block S204, the client sends a first updating request carried with the updating data and the first version information to the corresponding data node according to the identification information of the data node.

The first updating request from the client for a raw data block is carried with a version number of the target data block for the check by the data node.

At block S205, the data node receives the first updating request.

The first updating request is carried with the updating data and the first version information, where the first version information is information that is stored by the client and used for indicating a version of a target data block to be updated by the updating data, and a data amount of the updating data is less than a data amount of one erasure code group.

At block S206, the data node acquires second version information in response to the first updating request.

The second version information is information that is stored by the data node and used for indicating the version of the target data block.

At block S207, the data node acquires a first determination result by determining whether the first version information is matched with the second version information.

If the first determination result indicates that the first version information is not matched with the second version information, the data node sends a first updating response and discards the updating data, where the first updating response is carried with an unsuccessful update result and a cause value indicating that the unsuccessful update result is caused by an error of the first version information.

At block S208, if the first determination result indicates that the first version information is matched with the second version information, the data node updates the data block with the updating data.

At block S209, the data node updates the second version information after completing updating the data block.

At block S210, if the first determination result indicates that the first version information is matched with the second version information, the data node determines a check increment set $\{\Delta P_1, \Delta P_2, \ldots, \Delta P_g, \ldots, \Delta P_k\}$ according to the updating data and the target data block.

$\Delta P_g$ refers to the check increment of the g-th check node, g is greater than or equal to 1 and less than or equal to k, and k refers to a number of check data blocks matched with one erasure code.

At block S211, the data node sends a second updating request carried with the check increment $\Delta P_g$ of the g-th check node to the g-th check node.

The second updating request is used to trigger the g-th check node to update the check data stored by itself according to the check increment $\Delta P_g$ and update a version vector stored by the g-th check node itself.

At block S212, the check node receives the second updating request from the data node.

The second updating request is carried with the check increment $\Delta P_g$ and is used to update the check data block stored in the check node according to the check increment $\Delta P_g$ and update the version vector stored in the check node.

The second updating request may also include second version information that is stored by the data node and used for indicating the version of the target data block before update. Similar to the data node, it is also required for the check node to determine whether the version information carried in the second updating request is matched with the version information maintained by the check node. If matched, the following updating process (including updating a check data block with the check increment and updating the version information) is performed; if not, a second updating response is returned to the data node, where the second updating response is carried with an unsuccessful update result and a cause value (which is similar to the unsuccessful update of the data node).

The method of the example of the present disclosure also includes that: at block S2121, the check node acquires fourth version information indicating version information stored in the check node in response to the second updating request; at block S2122, obtains a second determination result by determining whether the second version information is matched with the fourth version information; at block S2123, processes the second updating request according to the second determination result. Acquiring the fourth version information includes: acquiring the fourth version information by querying a version vector stored by itself, where the version vector is a vector formed by current version information of "m" data blocks, and "m" is a number of data blocks in one erasure code group; if the second determination result indicates that the two pieces of version information are matched, performing block S213; otherwise, returning the second updating response to the data node, where the second updating response is carried with an unsuccessful update result and a cause value.

At block S213, the check node determines updated check data. $P_g'$ according to the check increment $\Delta P_g$ and check data $P_g$ stored in the check node and stores the updated check data $P_g'$.

At block S214, the check node updates the version vector stored by itself in response to the second updating request.

The version vector is a vector formed by version information of "m" data blocks, and "m" is a number of data blocks in one erasure code group.

The second updating request may also be carried with the identification information of the target data block and third version information indicating the updated version of the target data block. Updating the version vector stored by itself includes: updating the version information of a corresponding data block in the version vector stored by itself to the third version information according to the identification information of the target data block, or updating the version vector stored by itself according to the identification information of the target data block and the third version information.

At block S215, the check node updates the version vector and stores the check data $P_g'$, and sends a second updating response to the data node.

The second updating response is carried with a result indicating that the check increment $\Delta P_g$ is successfully updated.

At block S216, the data node receives the second updating response from the g-th check node.

The second updating response is carried with a result indicating whether the check increment $\Delta P_g$ is successfully updated.

At block S217, the data node determines whether the check increments $\Delta P_g$ corresponding to all "k" check data blocks are successfully updated.

At block S218, if the check increments $\Delta P_g$ corresponding to all "k" check data blocks are successfully updated and the update of the target data block is completed, the data node sends a first updating response to the client.

At block S219, the client receives the first updating response from the data node, where the first updating response is carried with an update result.

At block S220, if the update result indicates that the update is successful, the client updates the first version information.

As can be seen from the above, the version information is added in the technical solution of the example of the present disclosure, and the added version information has the following features.

1) The data node maintains one piece of version information (version number) incremented automatically, for each raw data block. In an implementation process, the version number may be denoted by an integer. For example, the version number initially is 0, and is incremented by 1 automatically at the time of write-in. Certainly, the version number may not be denoted by an integer. For example, if the previous version number is 1.1a, the next version number may be 1.1b. In addition, the version information of the data block is permanently stored.

2) The check node maintains version numbers of all "m" raw data blocks, for the check blocks stored in the check node. That is, the check node actually maintains a version vector, where the version vector is a vector formed by version information of "m" data blocks, and "m" is a number of data blocks in one erasure code group. In an implementation process, the version number may be denoted by an integer. For example, the version number initially is 0, and is incremented by 1 automatically at the time of write-in. Certainly, the version number may not be denoted by an integer. For example, if the previous version number is 1.1a, the next version number may be 1.1b. In addition, the version information of the data block is permanently stored.

3) The client itself may maintain the version information of the data blocks, and may also obtain the version numbers of all "m" raw data blocks by querying the data node.

In an example of the present disclosure, after checking the version number in the updating request, the data node may calculate $\Delta P_1, \Delta P_2, \ldots, \Delta P_k$ according to an existing method, send the check increments to "k" check nodes respectively, and notify the check nodes of the number i ($1 \le i \le m$) of the data node and the version number of the data block together; then, the data node writes new data into a hard disk, and increases its version number by 1. Then, after checking the version number in the updating request, the check node updates its check data p according to the existing method and increases the version number of the associated data block (the i-th block) maintained by the check node by 1, and finally returns a signal indicating a successful check update to the data node; then, the data node returns a signal indicating a successful update to the client after "k" check blocks are successfully updated respectively; finally, the client increases the version number of the data block maintained by the client by 1.

In another example of the present disclosure, for a particular EC group, the check node may correspondingly modify the version information that relates to a particular data block and is carried by the check data block only after the updates of all data blocks to be updated are completed. In this example, each check data block corresponds to one vector formed by version information of "m" data blocks, and the version vectors corresponding to different check data blocks are all same. For example, if m is 5, the version vector is Q=[q1, q2, q3, q4, q5], where q1 refers to version information of the first data block in one EC group, q2 refers to version information of the second data block in the same EC group as q1, q3 refers to version information of the third data block in the same EC group as q1, q4 refers to version information of the fourth data block in the same EC group as q1, and q5 refers to version information of the fifth data block in the same EC group as q1. If partial write-in is needed, that is, only the second data block in the EC group is to be updated, the client sends a first updating request carried with the version information of the second data block to the data node corresponding to the second data block, and then, the data node corresponding to the second data block performs blocks S205-S210. Further, if k=3, that is, if there are three check nodes, after the second data block is updated at the corresponding data node, the data node corresponding to the second data block may send a second updating request carried with the version information of the second data block to the three check nodes, and then, each of three check nodes performs block S212, block S2121 and block S2122; if each of the three check nodes determines that the version information of the second data block in the second updating request is matched with the version information of the second data block stored in the each check node, the three check nodes will all update the check data of the second data block and send an second updating response indicating that the update is completed to the data node corresponding to the second data block; after determining that three check nodes all finish the updates successfully, the data node corresponding to the second data block may also send a request of updating the version vector to the three check nodes. Then, the three check nodes may update the version information of the second data block in response to the request of updating the version vector, that is, update the vectors of the three check nodes. If q1, q2, q3, q4 and q5 are all integers, the version vector updated by each of the three check nodes is Q=[q1, (q2+1), q3, q4, q5]. In this example, the update of the version vector is actually passive, that is, the data node corresponding to the second data block notifies all check nodes of updating the version vector (that is, updating the version information of the second data block); however, the update in the example as shown in FIG. 2, is an active update by the check node (refer to block S214), where the version vector may be actively updated without the notification of the data node at block S214.

It is to be noted that the updating operations for different data blocks may be performed concurrently, where the updating operation may be considered as a write operation. The updating operations for the same data block cannot be performed concurrently, but may be performed in a flow-line manner, that is, a subsequent updating operation may be sent to a server without waiting for the completion of the previous updating operation. When it is desired to perform data recovery, the system needs to pause the updating operation for the EC group, and then determines a recovery operation according to the version numbers of different raw data blocks and the version vectors of the check blocks, where the block data with the largest version number is the latest.

Based on the above example, an example of the present disclosure provides an erasure code-based distributed storage system including a client, a data node and a check node, where the client includes a first erasure code-based partial write-in apparatus (referred to as a first apparatus), the data node includes a second erasure code-based partial write-in apparatus (referred to as a second apparatus), and the check node includes a third erasure code-based partial write-in apparatus (referred to as a third apparatus). Each unit included in the first apparatus may be implemented by a processor in an electronic device, each unit included in the second apparatus and each module included in each unit may be implemented by a processor in the data node, and each unit included in the third apparatus may be implemented by a processor in the check node.

In an implementation process, functions implemented by the processor may also be implemented by a specific logical circuit. In a specific example, the processor may be a central processing unit (CPU), a microprocessor unit (MPU), a digital signal processor (DSP) or a Field Programmable Gate Array (FPGA), or the like.

Figure 3:
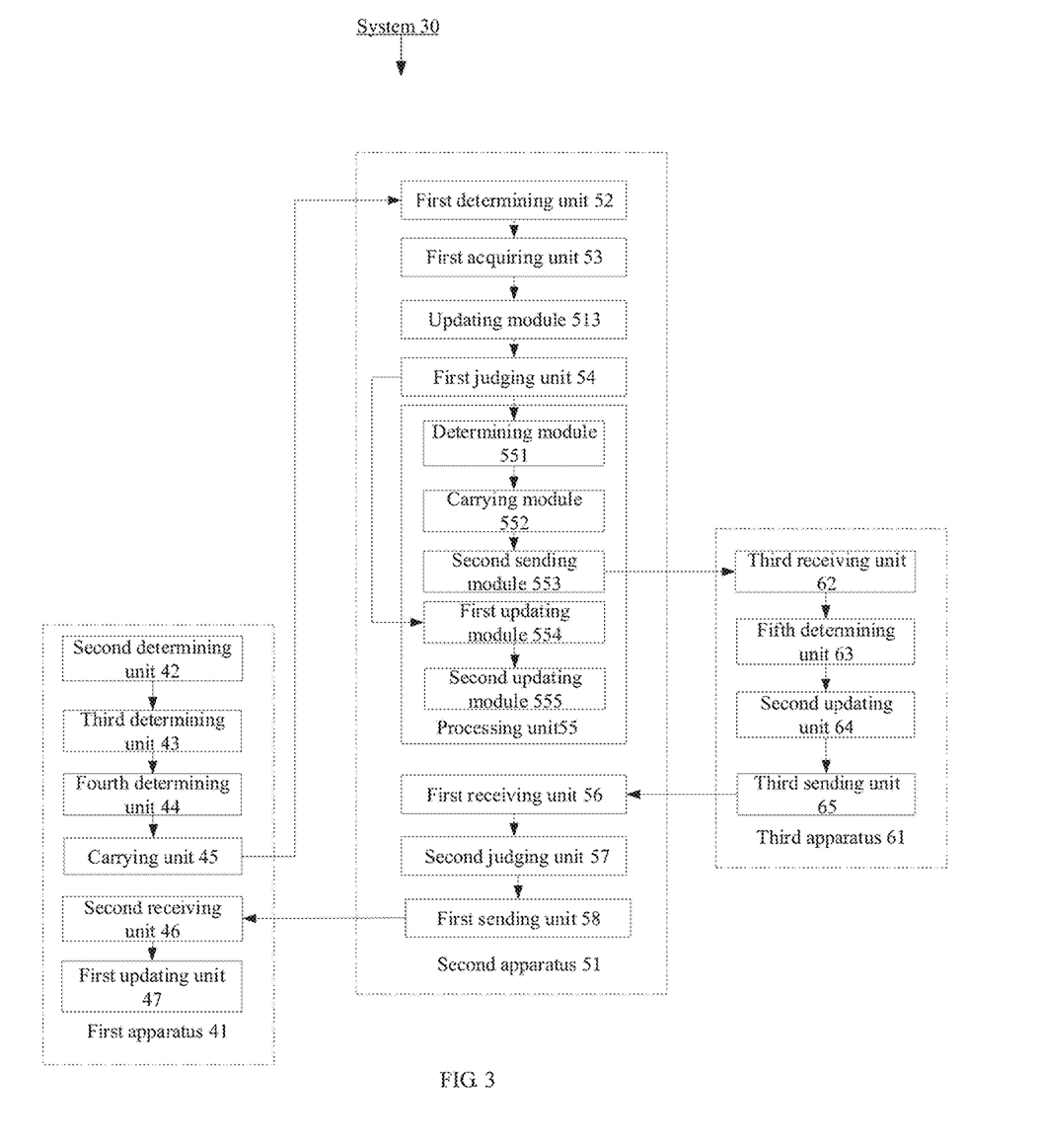
FIG. 3 is a schematic diagram illustrating a structure of an erasure code-based distributed storage system according to a third example of the present disclosure.

FIG. 3 is a schematic diagram illustrating a structure of an erasure code-based distributed storage system according to a third example of the present disclosure. As shown in FIG. 3, the system 30 includes a client, a data node and a check node, where the client includes a first apparatus 41, the data node includes a second apparatus 51, and the check node includes a third apparatus 61.

The first apparatus 41 includes a second determining unit 42, a third determining unit 43, a fourth determining unit 44, a carrying unit 45, a second receiving unit 46 and a first updating unit 47. The second apparatus 51 includes a first determining unit 52, a first acquiring unit 53, a first judging unit 54, a processing unit 55, a first receiving unit 56, a second judging unit 57 and a first sending unit 58, where the processing unit 55 includes a determining module 551, a carrying module 552, a second sending module 553, a first updating module 554 and a second updating module 555. The third apparatus 61 includes a third receiving unit 62, a fifth determining unit 63, a second updating unit 64 and a third sending unit 65.

The second determining unit 42 is configured to determine updating data and identification information of a target data block to be updated with the updating data, and a data amount of the updating data is less than a data amount of one erasure code group, where the erasure code group includes m data blocks and k check data blocks for recovering the data blocks, and both m and k are natural numbers.

The third determining unit 43 is configured to determine identification information of a corresponding data node according to the identification information of the target data block.

The fourth determining unit 44 is configured to determine first version information indicating a current version of the target data block according to the identification information of the target data block.

The carrying unit 45 is configured to carry the updating data and the first version information in a first updating request and send the first updating request to the data node according to the identification information of the data node.

The first determining unit 52 is configured to receive the first updating request carried with the updating data and the first version information from a client where the first version information is information that is stored by the client and used for indicating a version of a target data block to be updated with the updating data, a data amount of the updating data is less than a data amount of one erasure code group, the erasure code group includes m data blocks and k check data blocks, and both m and k are natural numbers.

The first acquiring unit 53 is configured to acquire second version information in response to the first updating request, where the second version information is information that is stored by the data node and used for indicating the version of the target data block.

The first judging unit 54 is configured to obtain a first determination result by judging whether the first version information is matched with the second version information.

The determining module 551 is configured to determine check increments of the k check data blocks in the erasure code group corresponding to the target data block according to the updating data and the target data block if the first determination result indicates that the first version information is matched with the second version information.

The carrying module 552 is configured to carry the check increment of each check data block in a second updating request respectively.

The second sending module 553 is configured to send the second updating request to the check node for storing the check data block to trigger the check node to update the check data block according to the check increment and update the version vector stored by the check node.

The first updating module 554 is configured to update the data block with the updating data if the first determination result indicates that the first version information is matched with the second version information.

The second updating module 555 is configured to update the second version information after the update of the data block is completed.

The third receiving unit 62 is configured to receive the second updating request from the data node, where the second updating request is carried with a check increment.

The fifth determining unit 63 is configured to obtain an updated check data block by updating the check data block stored by itself according to the check increment in response to the second updating.

The second updating unit 64 is configured to update the version vector stored by itself in response to the second updating request, where the version vector includes version information of m data blocks in an erasure code group corresponding to a target data block to be updated, the erasure code group also includes k check data blocks for recovering the m data blocks, and both m and k are natural numbers.

The second updating request is also carried with the identification information of the target data block and third version information that is stored by the data node and used for indicating the current version of the target data block. The second updating unit is configured to update the version information in the version vector that corresponds to the target data block to the third version information according to the identification information of the target data block.

The third sending unit 65 is configured to send a second updating response to the data node after completing updating the version vector and storing the check data $p_g'$, where the second updating response is carried with a result indicating that the check data block is successfully updated with the check increment.

The first receiving unit 56 is configured to receive the second updating response from the g-th check node, where the second updating response is carried with a result indicating whether the check data block stored by itself is successfully updated by the check increment $\Delta P_g$.

The second judging unit 57 is configured to judge whether all k check data blocks are successfully updated with the corresponding check increments; if all k check data blocks are successfully updated with the corresponding check increments and the update of the target data block is completed, the second judging unit 57 triggers the first sending unit to send a first updating response.

The first sending unit 58 is configured to send the first updating response to the first apparatus, where the first updating response is carried with a successful update result, and the successful update result is used to trigger the client to update the first version information.

The second receiving unit 46 is configured to receive the first updating response from the data node, where the first updating response is carried with an update result.

The first updating unit 47 is configured to update the first version information if the update result indicates that the update is successful.

In another example of the present disclosure, the processing unit includes a first sending module and a discarding module.

The first sending module is configured to send the first updating response if the first determination result indicates that the first version information is not matched with the second version information, where the first updating response is carried with an unsuccessful update result and a cause value, and the cause value is used to indicate that the unsuccessful update result is caused by an error of the first version information.

The discarding module is configured to discard the updating data.

It is to be noted that the descriptions of the above apparatus examples are similar to the descriptions of the above method examples and have beneficial effects similar to those of the method examples, which will not be described herein. For simplicity, technical details that are not disclosed in the apparatus examples of the present disclosure may be understood by referring to the descriptions of the method examples of the present disclosure, which will not be described herein.

It is to be noted that, in the examples of the present disclosure, the above erasure code-based partial write-in method, if implemented in the form of software functional modules and sold or used as independent products, may be stored in a machine readable storage medium. Based on such understanding, the technical scheme of the present disclosure essentially or a part contributing to the prior art may be embodied in the form of a software product, the computer software product is stored in a storage medium, and includes several instructions for enabling a machine device (such as a personal computer, a server or a network device) to execute all or part of the method disclosed by the examples of the present disclosure; and the above storage mediums include various mediums such as a USB disk, a mobile hard disk, a read-only memory (ROM), a diskette or a compact disk and the like which may store program codes. Therefore, the examples of the present disclosure are not limited to any particular combination of hardware and software.

Correspondingly, an example of the present disclosure also provides a machine readable storage medium storing machine executable instructions, where the machine executable instructions are executed by a processor to perform the erasure code-based partial write-in method in the example of the present disclosure.

Correspondingly, an example of the present disclosure also provides a data updating device, including a storage medium, a processor and machine executable instructions that are stored on the storage medium and executable by the processor, where the machine executable instructions are executed by the processor to implement the erasure code-based partial write-in method at a data node side, a check node side or a terminal side in the examples of the present disclosure.

Figure 4:
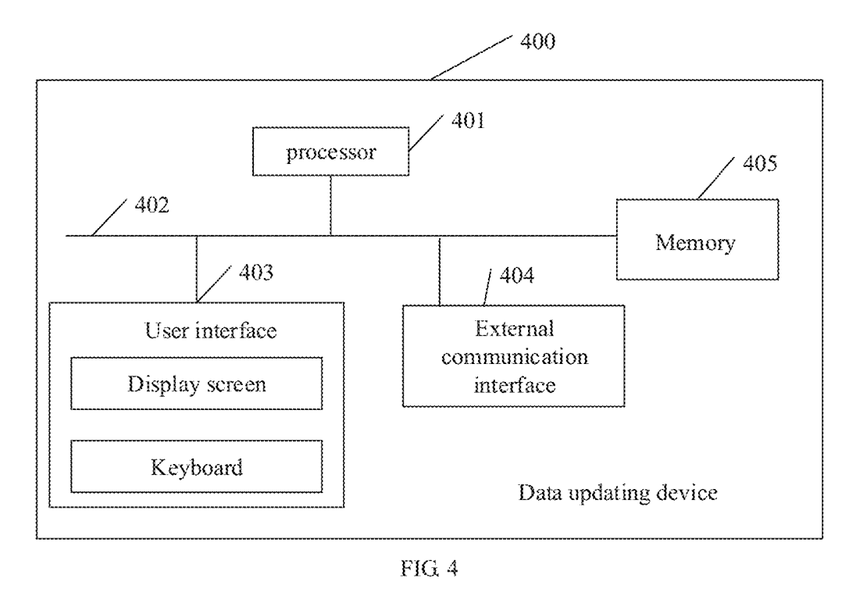
FIG. 4 is a schematic diagram illustrating a structure of a computing device according to an example of the present disclosure.

In an implementation process, the data node, the check node or the terminal may all be implemented by the data updating device. FIG. 4 is a schematic diagram illustrating a structure of a data updating device according to an example of the present disclosure. As shown in FIG. 4, the data updating device 400 may include: at least one processor 401, at least one communication bus 402, a user interface 403, at least one external communication interface 404 and a storage medium 405. The communication bus 402 is used to realize communication between these components. The user interface 403 may include a display screen and a keyboard. The external communication interface 404 may optionally include a standard wired interface and a wireless interface.

It is to be understood that "one example" or "an example" mentioned throughout the specification means that specific features, structures or characteristics relating to the example are included in at least one example of the present disclosure. Therefore, "in one example" or "in an example" appearing at different positions of the whole specification does not necessarily refer to the same example. In addition, the specific features, structures or characteristics may be combined in one or more examples in any appropriate manner. It is to be understood that in each example of the present disclosure, sizes of serial numbers in the above each process do not mean an implementation sequence, and the implementation sequence of each process should be determined by its functions and internal logic rather than constitute any limitations to the implementation processes of the examples of the present disclosure. The above sequence numbers in the examples of the present disclosure are only used for description, rather than represent superiorities and inferiorities of the examples.

It is to be noted that, herein, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

In several examples provided by the present disclosure, it is to be understood that the disclosed device and method may be implemented in another manner. The device examples described above are only illustrative. For example, the division of the units is only a logical function division, and the units may be divided in another manner during an actual implementation. For example, a plurality of units or components may be combined or integrated into another system, or some features may be neglected or may not be executed. In addition, coupling, direct coupling, or communication between the displayed or discussed components may be realized through some interfaces, and indirect coupling or communication of devices or units may be electrical, mechanical or in another form.

The above units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Further, different functional units in different examples of the present disclosure may be integrated into one processing unit, or each unit may be used as a separate unit, or two or more units may be integrated into one unit. The above integrated unit may be implemented in the hardware form or in the form of hardware and software functional units. Persons skilled in the art may understand that the implementation of all or part of blocks in the above method examples may be completed by hardware relating to program instructions. The above instructions may be stored in a machine-readable storage medium, and may be executed to perform the blocks of the above method examples. The above storage medium includes: a mobile storage device, a Read-Only Memory (ROM), a diskette or a compact disk and the like which may store program codes.

Optionally, the above integrated units of the present disclosure, if implemented in the form of software functional modules and sold or used as independent products, may also be stored in a machine-readable storage medium. Based on such understanding, the technical scheme of the present disclosure essentially or a part contributing to the prior art may be embodied in the form of a software product, the software product is stored in a storage medium, and includes several instructions for enabling a machine device (such as a personal computer, a server or a network device) to execute all or part of the blocks of the method disclosed by the examples of the present disclosure; and the above storage mediums include various mediums such as a mobile storage device, a read-only memory (ROM), a diskette or a compact disk and the like which may store program codes.

The above descriptions are merely specific examples of the present disclosure to which the scope of protection of the present disclosure is not limited. Any changes or substitutions that easily occur to those skilled in the art in the technical scope of the present disclosure should fall in the scope of protection of the present disclosure. Therefore, the scope of protection of the present disclosure is indicated as in appended claims.

The invention claimed is:

1. An erasure code-based partial write-in method, comprising:
   receiving, by a data node, a first updating request carried with updating data and first version information from a client, wherein the first version information is information that is stored by the client and used for indicating a version of a target data block to be updated with the updating data, a data amount of the updating data is less than a data amount of one erasure code group, the erasure code group comprises m data blocks and k check data blocks, and both m and k are natural numbers;
   acquiring, by the data node, second version information in response to the first updating request, wherein the second version information is information that is stored by the data node and used for indicating the version of the target data block; and
   processing, by the data node, the updating data according to a matching result of the first version information and the second version information.

2. The method according to claim 1, wherein processing the updating data according to the matching result of the first version information and the second version information comprises:
   sending, by the data node, a first updating response to the client and discarding the updating data in response to that the first version information is not matched with the second version information,
      wherein the first updating response is carried with an unsuccessful update result and a cause value, and
      the cause value is used to indicate that the unsuccessful update result is caused by an error of the first version information.

3. The method according to claim 1, wherein processing the updating data according to the matching result of the first version information and the second version information comprises:
   in response to that the first version information is matched with the second information,
      determining, by the data node, check increments of the k check data blocks in the erasure code group corresponding to the target data block according to the updating data and the target data block;
      carrying, by the data node, the check increment of each check data block in a second updating request respectively, and
      sending, by the data node, the second updating request to a check node for storing the check data block to trigger the check node to update the check data block according to the check increment and update a version vector stored by the check node.

4. The method according to claim 3, further comprising:
   receiving, by the data node, a second updating response from the check node, wherein the second updating response is carried with a result indicating whether the check data block is successfully updated with the check increment; and
   sending, by the data node, a first updating response to the client in response to that all k check data blocks are successfully updated with the corresponding check increments and updating of the target data block is completed,
wherein the first updating response is carried with a successful update result, and
the successful update result is used to trigger the client to update the first version information.

5. The method according to claim 1, wherein processing the updating data according to the matching result of the first version information and the second version information comprises:
in response to that the first version information is matched with the second information,
updating, by the data node, the target data block stored in the data node with the updating data; and
updating, by the data node, the second version information after completion of updating the target data block.

6. The method according to claim 5, further comprising:
sending, by the data node, a first updating response to the client after completion of updating the target data block,
wherein the first updating response is carried with a successful update result, and
the successful update result is used to trigger the client to update the first version information.

7. A non-transitory machine readable storage medium storing machine executable instructions, wherein the machine executable instructions are executed by a processor to perform the erasure code-based partial write-in method according to claim 1.

8. An erasure code-based partial write-in method, comprising:
determining, by a client, updating data and identification information of a target data block to be updated with the updating data, a data amount of the updating data being less than a data amount of one erasure code group, wherein the erasure code group comprises one or more data blocks and check data blocks for recovering the data blocks;
determining, by the client, identification information of a corresponding data node according to the identification information of the target data block;
determining, by the client, first version information indicating a current version of the target data block according to the identification information of the target data block;
carrying, by the client, the updating data and the first version information in a first updating request;
sending, by the client, the first updating request to the data node according to the identification information of the data node;
receiving, by the client, a first updating response from the data node, wherein the first updating response is carried with an update result; and
updating, by the client, the first version information in response to that the update result indicates a successful update.

9. A data updating device, comprising: a non-transitory storage medium, a processor and machine executable instructions that are stored on the non-transitory storage medium and executable by the processor, wherein the machine executable instructions are executed by the processor to implement the erasure code-based partial write-in method according to claim 8.

10. A non-transitory machine readable storage medium storing machine executable instructions, wherein the machine executable instructions are executed by a processor to perform the erasure code-based partial write-in method according to claim 8.

11. An erasure code-based partial write-in method, comprising:
receiving, by a check node, an updating request from a data node, wherein the updating request is carried with a check increment;
updating, by the check node, a check data block stored in the check node according to the check increment in response to the updating request to obtain an updated check data block;
updating, by the check node, a version vector stored in the check node in response to the updating request, wherein the version vector comprises version information of m data blocks in an erasure code group corresponding to a target data block to be updated, the erasure code group further comprises k check data blocks for recovering the m data blocks, and both m and k are natural numbers; and
sending, by the check node, an updating response to the data node, wherein the updating response is carried with a result indicating whether the check data block is successfully updated with the check increment.

12. The method according to claim 11, wherein
the updating request is further carried with identification information of the target data block and first version information that is stored in the data node and used for indicating a current version of the target data block, and
updating the version vector comprises:
updating, by the check node, the version information in the version vector that corresponds to the target data block to the first version information according to the identification information of the target data block.

13. The method according to claim 11, wherein
the updating request is further carried with second version information that is stored in the data node and used for indicating a version of the target data block before update,
the method further comprises:
acquiring, by the check node, third version information, wherein the third version information is information that is stored in the check node and used for indicating a version of the check data block; and
the check node processes the updating request according to a result indicating whether the second version information is matched with the third version information.

14. A data updating device, comprising: a non-transitory storage medium, a processor and machine executable instructions that are stored on the non-transitory storage medium and executable by the processor, wherein the machine executable instructions are executed by the processor to implement the erasure code-based partial write-in method according to claim 11.

15. A non-transitory machine readable storage medium storing machine executable instructions, wherein the machine executable instructions are executed by a processor to perform the erasure code-based partial write-in method according to claim 11.

16. A data updating device, comprising: a non-transitory storage medium, a processor and machine executable instructions that are stored on the non-transitory storage medium and executable by the processor, wherein, by executing the machine executable instructions, the processor is caused to:
receive a first updating request carried with updating data and first version information from a client, wherein the first version information is information that is stored by the client and used for indicating a version of a target data block to be updated with the updating data, a data amount of the updating data is less than a data amount of one erasure code group, the erasure code group comprises m data blocks and k check data blocks, and both m and k are natural numbers;

acquire second version information in response to the first updating request, wherein the second version information is information that is stored by the data node and used for indicating the version of the target data block; and process the updating data according to a matching result of the first version information and the second version information.

17. The device according to claim 16, wherein, when processing the updating data according to the matching result of the first version information and the second version information, the processor is further caused by the machine executable instructions to:

send a first updating response to the client and discard the updating data in response to that the first version information is not matched with the second version information, wherein the first updating response is carried with an unsuccessful update result and a cause value, and the cause value is used to indicate that the unsuccessful update result is caused by an error of the first version information.

18. The device according to claim 16, wherein, when processing the updating data according to the matching result of the first version information and the second version information, the processor is further caused by the machine executable instructions to:

in response to that the first version information is matched with the second information, determine check increments of the k check data blocks in the erasure code group corresponding to the target data block according to the updating data and the target data block;

carry the check increment of each check data block in a second updating request respectively, and send the second updating request to a check node for storing the check data block to trigger the check node to update the check data block according to the check increment and update a version vector stored by the check node.

19. The device according to claim 18, wherein, the processor is further caused by the machine executable instructions to:

receive a second updating response from the check node, wherein the second updating response is carried with a result indicating whether the check data block is successfully updated with the check increment; and send a first updating response to the client in response to that all k check data blocks are successfully updated with the corresponding check increments and updating of the target data block is completed, wherein the first updating response is carried with a successful update result, and the successful update result is used to trigger the client to update the first version information.

20. The device according to claim 16, wherein, when processing the updating data according to the matching result of the first version information and the second version information, the processor is further caused by the machine executable instructions to:

in response to that the first version information is matched with the second information, update the target data block stored in the data node with the updating data; and update the second version information after completion of updating the target data block.

\* \* \* \* \*